United States Patent
Baentsch et al.

(10) Patent No.: US 7,412,480 B2
(45) Date of Patent: Aug. 12, 2008

(54) DEVICE AND METHOD FOR UPDATING CODE

(75) Inventors: Michael Baentsch, Langnau a.A. (CH); Peter Buhler, Rueschlikon (CH); Thomas Eirich, Au (CH); Frank Hoering, Zurich (CH); Thomas D. Weigold, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 1018 days.

(21) Appl. No.: 09/894,035

(22) Filed: Jun. 28, 2001

(65) Prior Publication Data

US 2002/0002703 A1    Jan. 3, 2002

(51) Int. Cl.
*G06F 15/16* (2006.01)
(52) U.S. Cl. ............ 709/203; 709/201; 707/203; 707/204; 707/200; 717/179; 717/182; 717/176; 717/122; 713/179; 713/180; 713/175
(58) Field of Classification Search .......... 709/220, 709/221, 222, 203, 229, 201; 713/176, 193, 713/181, 156, 175, 194, 179, 180; 716/170, 716/122, 174, 100; 717/179, 182, 176, 122; 700/203, 204, 200

See application file for complete search history.

(56) References Cited

U.S. PATENT DOCUMENTS 5,155,847 A * 10/1992 Kirouac et al. ............ 709/221
6,052,531 A * 4/2000 Waldin et al. ............. 717/170
6,205,579 B1 * 3/2001 Southgate ................. 717/173
6,230,316 B1 * 5/2001 Nachenberg ............... 717/169
6,535,894 B1 * 3/2003 Schmidt et al. ............ 707/204
6,651,249 B2 * 11/2003 Waldin et al. ............. 717/170
2001/0050990 A1 * 12/2001 Sudia ....................... 380/286
2002/0026634 A1 * 2/2002 Shaw ........................ 717/173
2002/0038308 A1 * 3/2002 Cappi ..................... 707/104.1
2002/0116477 A1 * 8/2002 Somashekar et al. ....... 709/220

FOREIGN PATENT DOCUMENTS

WO    9856149    12/1998
WO    9949391     9/1999
WO    9963432    12/1999

* cited by examiner

*Primary Examiner*—Nathan J. Flynn
*Assistant Examiner*—Mohammad Siddiqi
(74) *Attorney, Agent, or Firm*—Scully, Scott, Murphy & Presser, P.C.; Alison D. Mortinger, Esq.

(57) ABSTRACT

The invention is directed to a method for a software provider to enable a software-acquiring entity to arrive from an existent first signed piece of code at a second signed piece of code. Both pieces of code were generated at the software provider by use of a first software archive generator under use of generation instructions. The software provider provides to the software-acquiring entity a difference code that comprises the steps necessary to arrive from the first signed piece of code at the second signed piece of code. The difference code is combinable at the software-acquiring entity with the first signed piece of code by a second software archive generator to generate the second signed piece of code. The second software archive generator is therefor to be fed with those generation instructions that were used by the first software archive generator for the generation of both pieces of code.

10 Claims, 1 Drawing Sheet

DEVICE AND METHOD FOR UPDATING CODE

BACKGROUND OF THE INVENTION

1. Technical Field

The present invention relates to a method for a software provider of enabling a software-acquiring entity to arrive from an existent first signed piece of code at a second signed piece of code. The invention also relates to a method for a software-acquiring entity of arriving from an existent first signed piece of code at a second signed piece of code.

2. Prior Art

Today's typical Java applications tend to be very large, consisting of even thousands of classes. Moreover, as the prevalent webbrowsers executing Java code require different Java packaging and signing formats, code is usually distributed twice, thereby further increasing the application's size. This increased complexity leads to ever more programming errors to become evident only when the programs are already rolled out to the customers. This necessitates bug fixes to be sent to the customers. As the Java programs are shipped in cryptographically signed containers, so far, the complete Java containers, possibly containing thousands of classes, need to be redistributed, even when only one single class file therein has been changed.

SUMMARY OF THE INVENTION

It is an object of the invention according to the independent claims to provide a method which reduces the amount of data to be transmitted while facilitating a change in functionality and retaining the security properties of signed code such as Java code containers.

Thus, the primary problem solved here is the reduction of the amount of data to be shipped to customers when modifying a first piece of code to arrive at a second piece of code, e.g. for correcting errors in code, or upgrading code to new feature sets.

The invention is hence directed to a method for a software provider to enable a software-acquiring entity to arrive from an existent first signed piece of code at a second signed piece of code. Both pieces of code were generated at the software provider by use of a first software archive generator under use of generation instructions. The software provider provides to the software-acquiring entity a difference code that comprises the steps necessary to arrive from the first signed piece of code at the second signed piece of code. The difference code is combinable at the software-acquiring entity with the first signed piece of code by a second software archive generator to generate the second signed piece of code. The second software archive generator is there for fed with those generation instructions that were used by the first software archive generator for the generation of both pieces of code.

The first software component-merging unit makes use of the generation instructions for generating the first signed piece of code. Since at the user those generation instructions are used to generate the second signed piece of code, it is of advantage if the generation instructions are provided to the software-acquiring entity by the software provider, preferably together with the second software archive generator. Thereby a better guaranty exists that the user is in possession of a set of tools that permit the correct generation of the second signed piece of code.

The system at the software provider side may further comprise a signature unit which has access to a private key. The pieces of code are signed using that private key. The public/private key system is a very widespread and well-known system for encryption which hence is easy to implement and use.

It is of advantage if the difference code is created, preferably by the first software archive generator, while the first software archive generator generates the second signed piece of code. Since the difference code reflects the steps of how to arrive at the second piece of code, the information to be put into the difference file is automatically created and available during the generation process.

For the software-acquiring entity the method of arriving from an existent first signed piece of code at a second signed piece of code whereby both pieces of code have been generated at the software provider by use of the first software archive generator under use of generation instructions comprise the steps of sending a code amendment request to the software provider for the delivery of a difference code which comprises the steps necessary to arrive from the first signed piece of code at the second signed piece of code, receiving the difference code and combining it with the first signed piece of code by use of a second software archive generator thereby generating the second signed piece of code. The second software archive generator is fed with those generation instructions that were used by the first software archive generator for the generation of both pieces of code. The user has the advantage of only using a small difference code instead of the whole new second signed piece of code. Downloading the difference code via a network may take significantly lesser time. For the software provider this holds also true. Also the costs for providing the difference file will be lower than the cost of a full version of the second signed piece of code.

The proposed method can be realized and marketed in form of a computer program product comprising program code for performing the proposed method. This computer program product can be stored on a computer-readable medium.

To understand the invention, first, the existing situation is described in more detail. It is assumed that an entity, such as a natural or a legal person, who has acquired a specific piece of code, the person in the following also referred to as user, wants to replace this code by a different piece of piece of code, both codes also referred to as software, preferably an updated version of the previously acquired piece of software. In the following it is, for the sake of giving a concrete example, assumed that the user wants to have an update for his already acquired software. Typically, the user requests the update at the origin of the already acquired piece of software. The originator of the software then may send an updated full version of the software to the user, or a software which when being executed in the presence of the not-yet updated software alters the existing software to then be the updated software. In case of signed software, i.e. where the integrity and originality of the software can be verified using a private/public key encryption scheme, such an update hitherto required the originator of the software to send a complete version of the update, since assembling of the previously acquired software together with the update in practically all cases would lead to a different signature which would be recognized by a verifier tool as non-original. It is however in the interest of the user to use the signature of a signed software to be able to distinguish the original, i.e. untouched by unauthorized hands, software from software that has been modified by some unauthorized entity. The user wants this benefit of the signature to persist also when an update is made. The user is also referred to as client and the software provider is also referred to as server. This, because a typical realization could be that the software provider does not act in person but has the providing function automated in a computer system, such as a server which automatically performs the necessary steps for providing the user who runs a client system, with the desired update code. On the user side the update request plus the eventual performing of the update can be automized in a computerized system, called the client.

A solution is proposed which uses cryptographically protected difference files permitting the re-creation of cryptographic signatures for the code to be updated. The approach presented for the re-creation of the client-side software's signatures has the advantage that it does not require the use of any new cryptographic functionality on the client side, but restricts this to the server-side, and the third-party execution environments, e.g., the webbrowsers. Software built on this general strategy has the advantage that it does not fall under any export restrictions, since it does not use cryptographic methods. Moreover, it is obviously more secure, as the signature key, i.e. the private key of the software provider, is not required on the client side to recreate the signatures.

The invention uses a novel approach to securely update signed applications already installed and deployed in the field over an inherently insecure medium, such as the Internet. It covers various techniques to make the above goal achievable in a very efficient manner. In essence, the concept could also be described to use online versioning check, combined with open security protocols, and differentiating techniques applied to signed document formats such as JAR or CAB.

BRIEF DESCRIPTION OF THE DRAWINGS

Preferred embodiments of the present invention will be now are described, by way of example only, with reference to the accompanying drawings in which.

Figure 1:
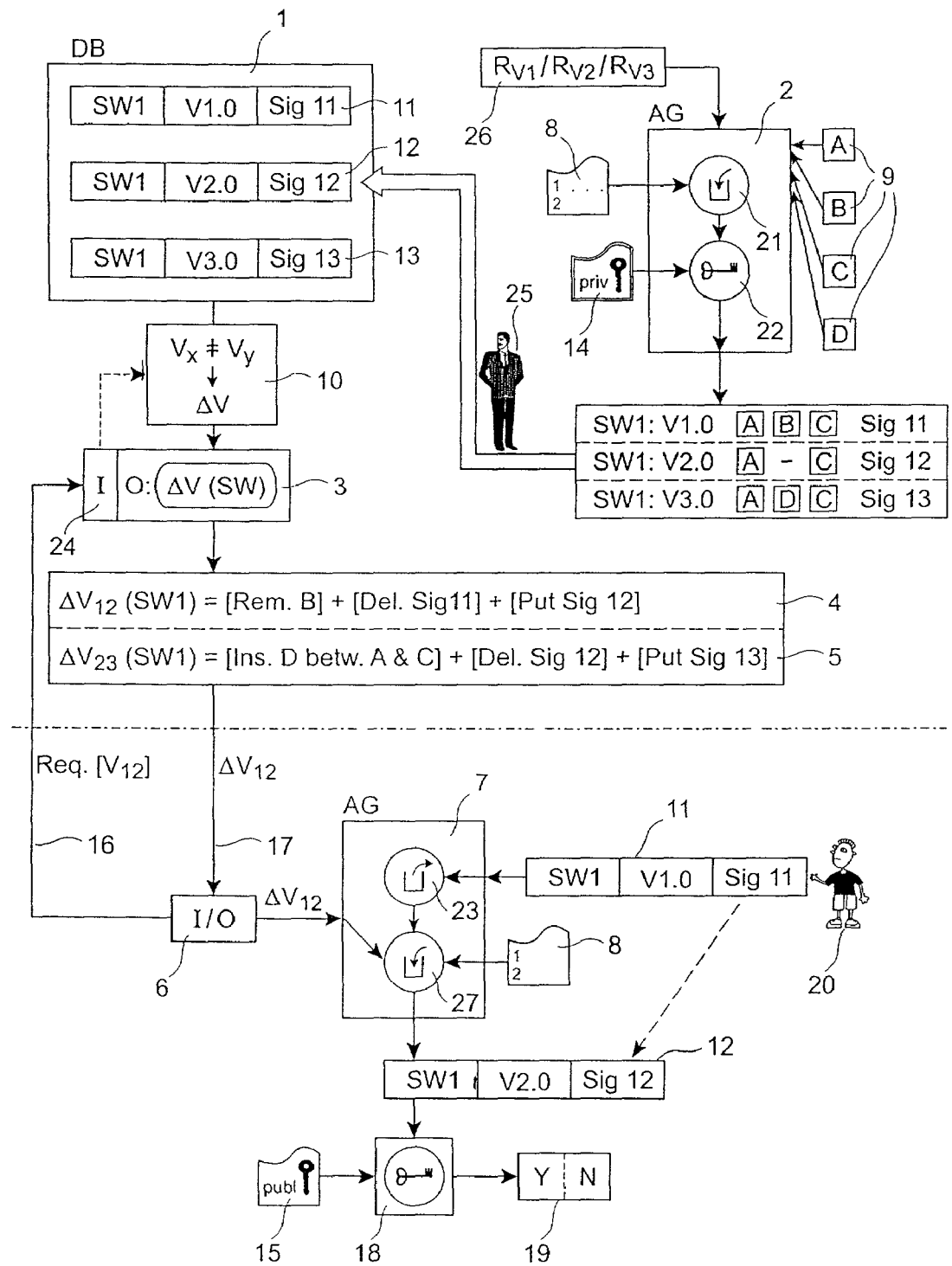
FIG. 1: a schematic overview over the involved steps and units in an exchange of code between a user and a software provider.

All the figures are for sake of clarity not shown in real dimensions, nor are the relations between the dimensions shown in a realistic scale.

DETAILED DESCRIPTION OF THE PREFERRED EMBODIMENTS OF THE INVENTION

In the following, the various exemplary embodiments of the invention are described.

1st Embodiment

In FIG. 1, a storage unit 1 is depicted which contains a database containing several signed pieces of code 11, 12, 13. These signed pieces of code 11, 12, 13 have been generated by a first software archive generator 2, also denoted with AG. The first software archive generator 2 comprises a first software component-merging unit 21 which makes use of generation instructions 8.

It further comprises a signature unit 22 which has access to a private key 14. In the depicted example, four software components 9, denoted with A, B, C, D, are fed to the first software archive generator 2 which according to the generation instructions 8 and version instructions 26 assembles these software components 9 to an assembly, also referred to as an archive or a container.

For each piece of code 11, 12, 13 these version instructions 26 contain the code-specific information of what is to be included in that particular piece of code 11, 12, 13, how and where it is to be included. Hence here for the first signed piece of code 11, it contains rules RV1 which tell that the three components A, B, C are to be put in, in exactly that order. For the second signed piece of code 12, it contains rules RV2 which tell that the two components A, C are to be put in, in exactly that order. For the third signed piece of code 13, it contains rules RV3 which tell that the three components A, D, C are to be put in, in exactly that order. The generation instructions 8 are of a more general kind, giving instructions that are relevant for the generation of any signed piece of code 11, 12, 13. This assembly is then signed by the signature unit 2, using the private key 14. The generation leads to three different versions here: A first version V1.0, a second version V2.0 and a third version V3.0. The first version V1.0 has a signature Sig 11 and with it builds a first signed piece of code 11. The second version V2.0 has a signature Sig 12 and with it builds a second signed piece of code 12. The third version V3.0 has a signature Sig 13 and with it builds a third signed piece of code 13. In this concrete example, the first version V11.0 consists of the three software components A, B, C plus the signature Sig 11, the second version V2.0 consists only of the two software components A, C plus the signature Sig 12, and the third version V3.0 consists of the three software components A, D, C plus the signature Sig 13.

As described above, these three pieces of code 11, 12, 13 are stored in the storage unit 1. The storage unit 1 is connected to a difference code generator 10 which delivers its output to an output unit 3 which is combined with an input unit 24. So far the infrastructure on the side of a software provider 25 has been described.

On the side of a software-acquiring entity 20, also called user 20, a second software archive generator 7 is present which contains a software component separator 23 and a second software component-merging unit 27 which is operable under use of the generation instructions 8 which are identical to those on the software provider side. The user 20 has the first signed piece of code 11 and desires to amend it to the second signed piece of code 12. Therefore the user 20 sends a code amendment request 16 which is accompanied by an identifier that gives the information which update is desired, to the software provider 25 via an input/output unit 6 to the input unit 24. The identifier here tells that the user 20 needs an update from the version V1.0 to the version V2.0 of the software SW1. The identifier can be a version number describing the current feature set and may be any character string, or numerical value.

The code amendment request 16 is received in the input unit 24 of the software provider 25 and in suit thereof the difference code generator 10 compares the two versions V1.0 and V2.0 and generates a corresponding difference code DV(SW1) which here is a first difference code 4, i.e. DV12 (SW1). The content of this code are the instructions for amending the first version V1.0 into the second version V2.0 and tell that the software component B is to be removed and the signature Sig 11 is to be removed and replaced by the signature Sig 12. The difference code generator is hence a tool for extracting the differences in contents and the signatures of two signed container files tools, namely the first signed piece of code 11 and the second signed piece of code 12. The exact order of all entries contained in an updated and signed container are recorded.

The first difference code 4 contains hence all steps necessary to arrive, starting from the first piece of code 11, at the second piece of code 12. These steps are given with a precision that is necessary for the software archive generator 7 on the user side to generate the second signed piece of code 12 in a way that in the end, the signature Sig 12 which belongs to the second piece of code 12 is the correct signature for the then updated piece of code on the user side. One could say that the difference file 4 reflects the version instructions 26 for the user 20, such that at the user 20 only the generation instructions 8 are needed.

The verification of the signature Sig 11, Sig 12, Sig 13 of a specific piece of code issues a specific result that depends on the internal structure of the code, since typically a hashing technique is used for signing. For a signature Sig 11, Sig 12, Sig 13 to be correctly identified and verified for a certain piece of code, hence the internal structure of that piece of code must be identical to the internal structure of the piece of code that was signed, because the private/public key cryptosystem ensures that with a extraordinarily high probability the results for two different pieces of code are different. This applies to any of the typically used encryption schemes which base on an inherent asymmetry in that the time used for generating an encrypted file is much shorter, typically several orders of magnitude, than the time that would be needed for arriving from the encrypted file at the unencrypted file. The latter time in practical cases exceeds human lifetime which is hence defined as secure in terms of encryption.

It has hence to be ensured that the process on the user side for amending the first piece of software 11 into the second piece of software 12 is done in a way that guarantees that the resulting second signed piece of code 12 has the exact internal structure as had the original second signed piece of code 12 as it was generated and signed on the software provider side. The first difference code 4 together with the generation instructions 8 and the component-merging unit 21 form a toolbox that guarantees that the generation process on the user side matches the generation process on the software provider side. This matching ensures that the internal structure of the second signed piece of code 12 when it is generated on the user side is identical to the internal structure of the second signed piece of code 12 as it is stored on the software provider side.

Once the first difference code 4 has been received at the input/output unit 6, it is forwarded to the second software archive generator 7. There, the first piece of code 11 is first separated into its software components 9 which are then merged by the component-merging unit 21 according to the generation instructions 8 and the instructions contained in the first difference code 4. The result is the second signed piece of code 12 with its signature Sig 12. The subsequent verification with the cryptographical verification unit under the use of the public key 15 hence must result in a positive verification result 19.

With this method, only the difference code 4 had to be transmitted and not the whole second piece of code 12. In case of large pieces of code, the difference in size between the second piece of code 12 and the difference code 4 can be very big and of enormous impact, thinking of transfer costs for electronic transmission for example. The transmission of small pieces of code via an electronic network like the Internet takes less time and is cheaper and less prone to interruptions and data losses compared to the transmission of pieces of code with big size. The transmission does not need to be done via an electronic network but can be made in any human or machine-readable form and via any suitable medium, such as in printed form, printers and scanners, mails-systems or hand-carried or via optical networks, or as magnetically stored data. The difference code 4 is also referred to as update or difference file.

The second software archive generator 7 is able to process the update 4, i.e., merging the new update 4 into the existing first signed piece of code 11 already installed at the user 20. The advantage lies in the fact that the update 4 contains the exact order of contents that is adhered to by the client-side second software archive generator 7 for re-creating the exact same code container structure as present on the server-side when signing the software 11 being updated. This allows the client-side to correctly recreate the updated software 12 intact as far as the signature and the contents are concerned.

2nd Embodiment

Extending the above described example, it is assumed that the user 20 wants to arrive from the first signed piece of code 11 at the third signed piece of code 13. For this update, in principle two steps are necessary, namely a first update using the first difference code 4 for arriving from the first signed piece of code 11 at the second signed piece of code 12 and a second update using the second difference code 5 to arrive from the second signed piece of code 12 at the third signed piece of code 13.

There exist several possibilities there for:

a) The difference code is determined for exactly the transition from the first signed piece of code 11 to the third signed piece of code 13. The difference code generator 10 can do this by comparing those two signed pieces of code 11, 13.

b) The user 20 receives the two difference codes 4, 5 and one update is performed after the other in the second software archive generator 7. This is however considered as not very elegant and puts the burden to the user 20 who has to cope with two updates which is more clumsy and probably also slower. Actions in the first update that have become redundant because the later update cancels them, waste time and bandwidth if the difference codes 4, 5 have been transmitted via a network. This situation exacerbates with rising number of intermediate updates necessary to perform the overall upgrade.

c) The two difference codes 4, 5 are combined to the overall difference code which then is transmitted to the user 20.

The difference codes 4, 5 need not be determined upon request of the user 20 but can also be predetermined at any point in time before and can be stored e.g. also in the database. The response to the code amendment request can of course be faster when the difference code 4, 5 was pre-generated and stored before. In the case of a huge number n of different versions Vx.x this method will however lead to a huge number of update difference codes 4, 5, namely theoretically $n*(n-1)/2$ different difference codes 4, 5 if every possible update combination is pre-generated and stored. A simplified scheme would be to only pregenerate the difference codes 4 from a subset of the possible combinations. In the case of a series of subsequent updates, this set could contain a difference code 4, 5 from each version Vx.0 to its subsequent version V(x+1).0. Thereby a chain of difference codes 4, 5 is pre-generated which comprises only n−1 different difference codes 4, 5. If a request for an update arrives that covers several steps of updates, i.e. difference codes 4, 5, the corresponding difference codes 4, 5 can be combined as suggested under c) above. In realistic cases, the probability of such update requests is typically much smaller than the probability of update requests from one version to its subsequent version.

The communication between the user 20 and the software provider 25 can be made using an authentication scheme. The two involved parties, i.e. the user 20 and the software provider 25, thereby can determine whether the other party is trustable and is not another party pretending to be the true other party. This authentication process facilitates communication and avoids situations in which after the update the verification results the recognition of a fraudulous update attempt.

The authentication scheme could be integrated as follows:

The server 25 on the software provider side is running an authentication protocol like the SSL protocol requiring client-authentication.

The server 25 maintains a repository of the signed pieces of code 11, 12, 13, also referred to as software files, indexed by version numbers describing all possible versions previously handed out to the user 20, i.e. customer. The server 25 may also have stored the signed difference files 4 containing all data and all signature-related information necessary to transform a given software file into another software file, preferably the most current software version.

On the client side runs a client code, such as a SSL client code, that may be used to establish a secure connection to the above server 25.

The client side authentication software further contains a cryptographic certificate and a key that was contained in the original software distribution, e.g., on a personalized disk coming with a product CD carrying the original software file code, that can be used to perform a client-authentication protocol with the software-distributing server 25. This way, the client 20 can make sure that the server 25 it talks to is an authentic server 25, and the server 25 knows that the client 20 it talks to is eligible for the software update 4.

The software update 4 is transmitted over this secure connection to the client 20.

The client 20 checks the update's contents: In particular, the version information contained in the software update 4, 5 is checked if it is appropriate, possibly identical, to the current version present on the client 20.

The client side software then extracts all data necessary and joins it into the existing software 11 already present at the client 20. In particular, the order of contents in all signed code containers is appropriately restored such that the signatures attain their functionality and correctness originally created on the server-side.

In the final step, all signatures Sig 11, Sig 12, Sig 13 contained in the update file 4, 5 received from the server 25 are applied to the appropriate files, i.e., the signed code containers, e.g. the Netscape JAR or Microsoft CAB files.

The approach outlined above may be applied to any form of data requiring continued updates, while being signed with one of the file formats discussed above, e.g. Microsoft CAB or Netscape JAR.

The scenario described above can be augmented or replaced by a non-connection-oriented scenario, in which the difference file itself is cryptographically protected. This makes sense, if no online connection to the software distribution server 25 can be established, or is not desirable. In that case, the server-side software distribution facility applies a cryptographic signature Sig 11, Sig 12, Sig 13 to the difference file 4, 5 that is checked by the client-side update software in a manner equivalent to the secure-session establishment in the online SSL connection establishment outlined above. The file formats suitable for this approach are the same formats that may be handled internally, i.e., e.g., Netscape/Sun JAR or Microsoft CAB.

Even without authentication the signature Sig 11, Sig 12, Sig 13 provides a degree of security which is not corrupted by the update process. The verification namely issues a negative result if, for whatever reason, the signature Sig 11, Sig 12, Sig 13 that is part of the updated second piece of code 12 is not correct, i.e. does not match the expected signature Sig 11, Sig 12, Sig 13 that is calculated by using the public key 15. In such a case the non-matching signature Sig 11, Sig 12, Sig 13 signals that something went wrong and that the update is not to be trusted. The user 20 may hence decide not to use the updated second piece of code 12, since some unauthorized modification may have introduced a security problem which might harm the user 20. If the user 20 has kept a backup copy of the first signed piece of code 11, he can delete the updated version 12 and he still has the original first signed piece of code 11 to use.

The described embodiments are combinable in part as well as in whole. For the sake of understanding it is to be noted that when an update is referred to, the invention is not restricted to software updates, but can be applied to perform a step from a first signed piece of code 11 to a second, third, etc. piece of code 12, 13, . . . while maintaining the advantage and correctness of the signature that has been created for the first signed piece of code 11. As a software archive generator 2, 7 any piece of code respectively its hardware version is meant that performs the function of putting together software components in order to unify them as a single software product or computer program, particularly in order to deliver it to a customer or other entity.

It is obvious for the person skilled in the art that the present invention can be realized in hardware, software, or a combination of these. Also, it can be implemented in a centralized fashion on one single computer system, or in a distributed fashion where different elements are spread across several interconnected computers or computer systems, whereby any kind of a computer system—or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent is:

1. A computer-implemented method of a software provider (25) enabling a software-acquiring entity (20) to arrive from an existent first signed piece of code (11), which is executable on a machine, at a second signed piece of code (12, 13), which is executable on the machine, both pieces of code (11, 12, 13) having been generated by use of a first software archive generator (2) under use of generation instructions (8), comprising the step of:

providing to said software-acquiring entity (20) a difference code (4, 5), said difference code comprising the steps necessary to arrive from said first signed piece of code (11) at said second signed piece of code (12, 13), said steps further including instructions to amend said first signed piece of code so that a signature belonging to said second signed piece of code is the same signature for a corresponding second signed piece of code existing at the software provider, said difference code (4, 5) is usable at said software-acquiring entity (20); and amending using said difference code said first signed piece of code (11) by a second software archive generator (7) to generate said second signed piece of code (12, 13), whereby said second software archive generator (7) is fed with those generation instructions (8) that were used by said first software archive generator (2) for the generation of both pieces of code (11, 12, 13), wherein for more than two nieces of code (11, 12, 13) being stored, the difference code (4, 5) is generated only between a subset of said pieces of code (11, 12, 13) and wherein for arriving from the first piece of code (11) to the second piece of code (13) several difference codes (4, 5) are required, these difference codes (4, 5) are merged to a single difference code to be provided to the software-acquiring entity (20).

2. The computer-implemented method according to claim 1, wherein the generation instructions (8) are provided to the software-acquiring entity (20) by the software provider (25) together with the second software archive generator (7).

3. The computer-implemented method according to claim 1, wherein the pieces of code (11, 12, 13) are signed using a private key (14).

4. The computer-implemented method according to claims 1, wherein the signed pieces of code (11, 12, 13) are stored in a storage unit (1) at the software provider (25).

5. The computer-implemented method according to claims 1, wherein the difference code (4, 5) is created by the first software archive generator (2), while said first software archive generator (2) generates the second signed piece of code (12, 13).

6. The computer-implemented method according to claims 1, wherein the first and second piece of code (11, 12, 13) are identified at the software provider (25) by deriving a corresponding identifier from a request (16) received from the software-acquiring entity (20).

7. A computer-implemented method for a software-acquiring entity (20) to arrive from an existent first signed piece of code (11), which is executable on a machine, at a second signed piece of code (12, 13), which is executable on the machine, both pieces of code (11, 12, 13) having been generated at a software provider (25) by use of a first software archive generator (2) under use of generation instructions (8), comprising the steps of:

sending a code amendment request (16) to said software provider (25) for the delivery of a difference code (4, 5) which comprises the steps necessary to generate from said first signed piece of code (11), said second signed piece of code (12, 13), said steps further including instructions to amend said first signed piece of code so that a signature belonging to said second signed piece is the same signature for a corresponding second signed piece of code existing at the software provider, receiving said difference code (4, 5), amending using said difference code (4, 5) said first signed piece of code (11) by use of a second software archive generator (7), thereby generating said second signed piece of code (12, 13), whereby said second software archive generator (7) is fed with those generation instructions (8) that were used by said first software archive generator (2) for the generation of both pieces of code (11, 12, 13), wherein for more than two nieces of code (11, 12, 13) being stored, the difference code (4, 5) is generated only between a subset of said pieces of code (11, 12, 13) and wherein for arriving from the first piece of code (11) to the second piece of code (13) several difference codes (4, 5) are required, these difference codes (4, 5) are merged to a single difference code to be provided to the software-acquiring entity (20).

8. The computer-implemented method according to claim 7, wherein the generation instructions (8) are received from the software provider (25) together with the second software archive generator (7).

9. The computer-implemented method according to claim 7, wherein the pieces of code (11, 12, 13) are signed by use of a private key (14) and the signature (Sig 11, Sig 12, Sig 13) is verifiable by use of a corresponding public key (15).

10. The computer-implemented method according to claims 7, wherein the first and second piece of code (11, 12, 13) are identified by the software-acquiring entity (20) by giving a corresponding identifier in the code amendment request (16).

* * * * *